(12) United States Patent
Del Toro et al.

(10) Patent No.: US 9,559,743 B2
(45) Date of Patent: Jan. 31, 2017

(54) MOBILE DEVICE COVER WITH DISPLAY MODULE

(71) Applicant: INCIPIO, LLC, Irvine, CA (US)

(72) Inventors: Carlos Del Toro, Whittier, CA (US); Andy Fathollahi, Corona Del Mar, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

(21) Appl. No.: 14/826,013

(22) Filed: Aug. 13, 2015

(65) Prior Publication Data

US 2015/0349832 A1 Dec. 3, 2015

Related U.S. Application Data

(62) Division of application No. 14/207,515, filed on Mar. 12, 2014, now Pat. No. 9,134,762.

(60) Provisional application No. 61/779,696, filed on Mar. 13, 2013.

(51) Int. Cl.
*H04B 1/38* (2015.01)
*H04B 1/3888* (2015.01)
*H04M 1/725* (2006.01)
*G06F 1/16* (2006.01)

(52) U.S. Cl.
CPC .......... *H04B 1/3888* (2013.01); *G06F 1/1628* (2013.01); *G06F 1/1632* (2013.01); *H04M 1/72527* (2013.01); *G06F 2200/1633* (2013.01)

(58) Field of Classification Search
CPC .. H04M 2250/22; H04M 1/04; H04M 1/0202; H04M 1/0266; H04M 1/72527; H04M 1/72583; H04M 2250/04; H04M 1/236; H04M 1/72575; H04M 2250/02; H04M 2250/16; H04M 3/5116; H04M 19/04; H04M 19/048
USPC ............................................. 455/550.1–90.3
See application file for complete search history.

(56) References Cited

U.S. PATENT DOCUMENTS

| | | | | |
|---|---|---|---|---|
| 2009/0135311 | A1* | 5/2009 | Kurita | H04N 21/41407 348/739 |
| 2013/0120223 | A1* | 5/2013 | Enzmann | G06F 3/1454 345/2.3 |
| 2013/0143540 | A1* | 6/2013 | Kalra | H04L 67/1095 455/416 |

* cited by examiner

*Primary Examiner* — Ronald Eisner
(74) *Attorney, Agent, or Firm* — Manatt, Phelps & Phillips, LLP

(57) ABSTRACT

A mobile device case or cover can include a display module that can display notifications or other useful data to users. The display module can communicate wirelessly with the mobile device to obtain notifications. In addition, in some embodiments, the display module can communicate with a secondary mobile device (such as a phone in a user's pocket) to obtain notifications or other data.

7 Claims, 11 Drawing Sheets ent entirety and are to be considered a part of this specification.
MOBILE DEVICE COVER WITH DISPLAY MODULE

INCORPORATION BY REFERENCE TO RELATED APPLICATION

This application is a divisional of U.S. application Ser. No. 14/207,515, filed Mar. 12, 2014, which claims benefit under 35 U.S.C. §119(e) from U.S. Provisional Application No. 61/779,696, filed on Mar. 13, 2013. The above applications are hereby incorporated herein by reference in their entirety and are to be considered a part of this specification.

BACKGROUND

With each new generation, portable electronic devices provide greater functionality and have more capabilities. These portable electronic devices allow people to play and record music, send and receive e-mail, send text messages, browse Web pages, make phone calls, play and record video, take and view pictures, edit documents, and much more. These devices continue to revolutionize the way people interact, learn, connect with other people, conduct business, and find information. They help people manage their daily lives and can be a source of entertainment. These devices can be used to store valuable information including personal information, such as phone numbers, financial information, private photos or videos, and favorite music tracks.

Typically these devices are intended to be carried or moved about. As such, these devices are more vulnerable to damage as compared to non-portable devices. Portable electronic devices are more likely to be accidentally dropped, hit, or scratched. While some types of damage may be cosmetic (e.g., scratches), other types of damage may ruin or limit the functionality of the device. Often these devices contain sensitive and fragile components (e.g., screen, camera lens, flash memory, processors, accelerometers, and sensors). Accidentally dropping the device could render various features unusable. Accordingly, protective cases are often used to protect these devices from possible damage.

SUMMARY

For purposes of summarizing the disclosure, certain aspects, advantages and novel features of several embodiments have been described herein. It is to be understood that not necessarily all such advantages can be achieved in accordance with any particular embodiment of the features disclosed herein. Thus, the embodiments disclosed herein can be embodied or carried out in a manner that achieves or optimizes one advantage or group of advantages as taught herein without necessarily achieving other advantages as can be taught or suggested herein.

In certain embodiments, a mobile device assembly includes a mobile device case that includes a case that can at least partially cover a first mobile device and a display module coupled with the case. The display module can include a first display separate from a second display of the first mobile device. The display module can wirelessly receive data from one or both of the first mobile device and a second mobile device and output the received data for presentation to a user.

In other embodiments, a mobile device assembly includes a mobile device case that includes a mobile device case that can be detachably coupled to a mobile device and a display module coupled with the case. The display module can receive data from a mobile device separate from the display module and output the received data for presentation to a user.

Further, in various embodiments, a method of using a mobile device case can include listening, with a display module of a mobile device case, for notifications from a mobile device implementing a case synchronization application, receiving a notification from the case synchronization application, and outputting the notification to a display of the display module.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

DETAILED DESCRIPTION

I. Introduction

In addition to protecting a mobile device, protective cases or covers can also enhance the functionality of the mobile device. Many cases, for instance, include a kick-stand or fold into a shape that permits the mobile device to be propped up into a more comfortable typing position. Other cases can hold a stylus when a stylus is not being used by a user.

One problem with cases in general is that they tend to cover up the mobile device display. This is indeed a major purpose of a protective case—to protect the display. In doing so, however, the case may obscure the display or a portion thereof, sometimes preventing a user from receiving useful or important notifications or information. A mobile phone, for instance, may be in silent mode and receive a call. If the phone is inside a case or is otherwise covered, the user may not notice the incoming call. Out of courtesy to others, users often cover their mobile devices during meetings and therefore potentially miss important notifications or other useful information that would ordinarily be displayed on their mobile devices. Cases also serve the purpose of concealing potentially confidential or personal information from public view. However, in doing so, other information useful to the user is also concealed.

This disclosure describes embodiments of a mobile device case or cover that includes a display module that can display notifications or other useful data to users. The display module can communicate wirelessly with the mobile device to obtain notifications. In addition, in some embodiments, the display module can communicate with a secondary mobile device (such as a phone in a user's pocket) to obtain notifications or other data. Specific information or data may be displayed on the display module of the case, while other information on the mobile device may remain concealed by the case.

II. Example Case Display Modules

Figure 1A:
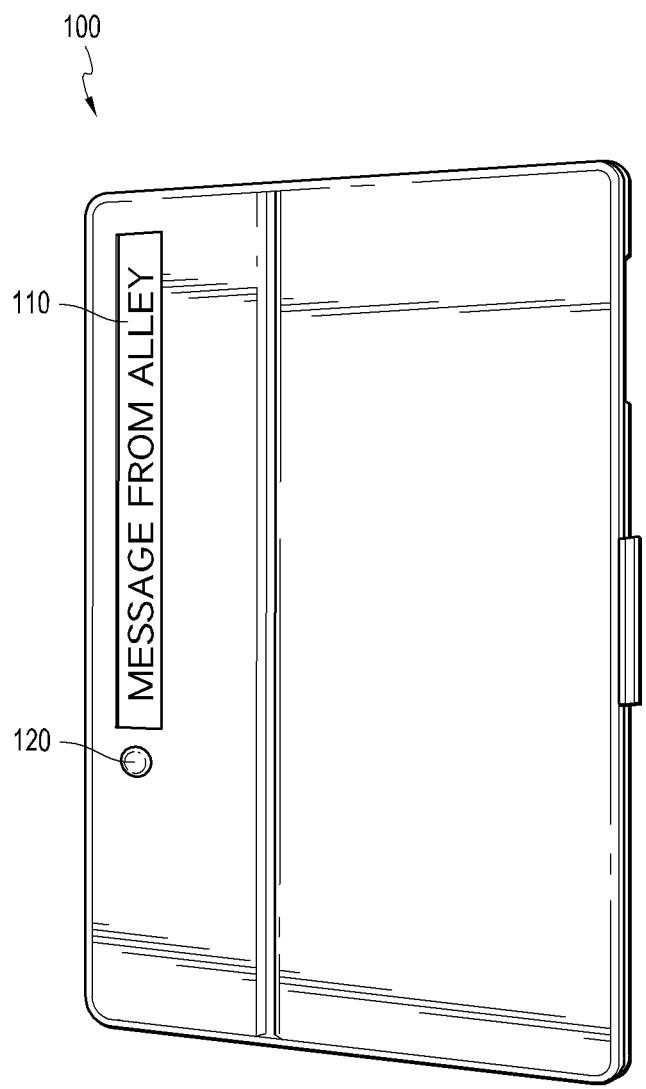
FIGS. 1A and 1B depict embodiments of a mobile device case coupled with a mobile device.
Figure 1B:
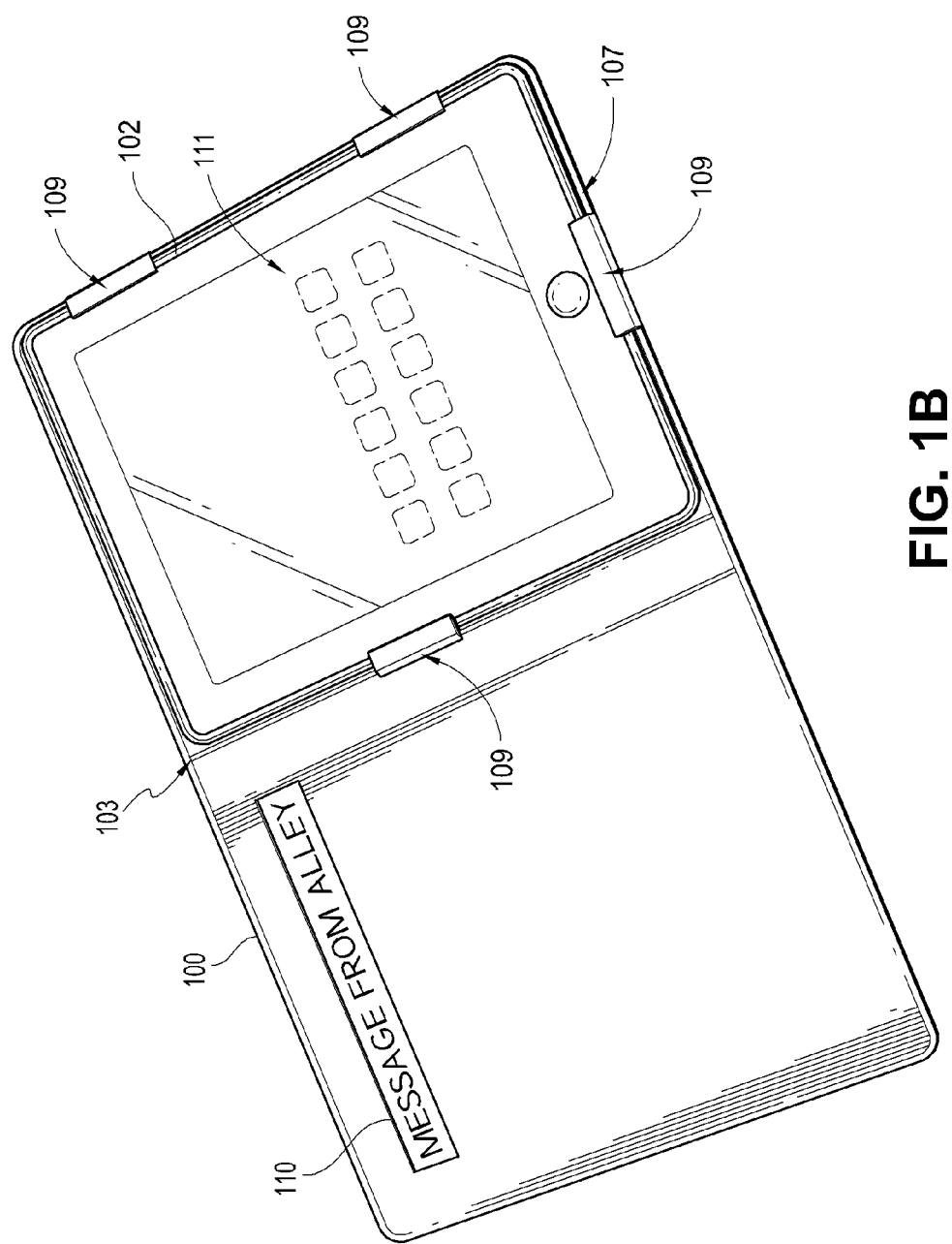

FIGS. 1A and 1B depict embodiments of a mobile device case 100 that can at least partially cover, at least partially surround, or otherwise be coupled with, a mobile device 102. In FIG. 1A, the mobile device case 100 includes a display module 110 disposed on the outside of the case 100. This display module 110 can include a hardware display, such as an LCD or LED display (or other visual, audio, and/or tactile display), which can display or present or provide notification of any of a variety of messages or data to a user of the mobile device 102. The data displayed by the display module 110 may provide the user with at least a portion of the information that may be accessed with the mobile device 102 without having to open the case 100 to view a screen 111 (see FIG. 1B) of the mobile device 102.

In certain embodiments, the case 100 may be a hard case or a soft case. If the case 100 is a hard case, the case 100 may be made of aluminum, plastic, carbon fiber, or some other hard metal or synthetic material for protection of the mobile device 102. The case 100 may also be a soft case made of a leather or composite material that is more flexible than a hard case but which still may protect the mobile device 102. The case 100 can be a folio like case or the like that includes a flap 100 that hinges open at a fold or crease 103 in a soft cover case (see FIG. 1B) or on hinges in a hard cover case. Alternatively, the case 100 may instead be a sleeve into which the mobile device 102 is slipped into and slipped out of. Cut-outs in the case 100 may be provided where helpful to provide user access to charging ports, buttons or other input/output devices of the mobile device 102. The case can also include both hard and soft materials, for example, with a hard exterior case for shielding from impacts and soft interior lining to absorb impacts.

The mobile device 102 may be a tablet, combination laptop/tablet, computer, a mobile phone, laptop, an e-reader or electronic book reader, a personal digital assistant (PDA), a portable game device, a music player such as an MP3 player, a portable digital recorder or Dictaphone, or any other portable electronic device that can benefit from being protected by a case such as the case 100.

In FIG. 1A, the display module 110 is on the outside of the case 100 and may be viewed more easily when the case 100 is closed. In contrast, FIG. 1B depicts the display module 110 on the inside of the case 100, which may be viewed concurrently while viewing the screen 111 of the mobile device 102. As shown in FIG. 1B, the case 100 can include a holder for releasably securing the mobile device 102 to the case 100. Desirably, the case and/or the holder define an envelope within which the mobile device 102 is positioned. For example, the holder 107 may comprise a recess and overhanging grippers 109. Alternatively, the holder 107 may simply comprise a releasable fastener such as a snap or a hook and loop fastener or may be comprised of a bezel or other known retention means. In either configuration, the display module 110 can depict or present text, audio, and/or images obtained from the mobile device 102 or from a different device, such as another of the user's devices that is not contained within the case (see e.g., FIG. 2 below).

In one embodiment, the display module 110 includes a wireless module (see FIG. 3) such as a Bluetooth (including Bluetooth Low Energy) or 802.11x (Wi-Fi) module that can communicate wirelessly with the mobile device 102 or with another device. The wireless module may be an electronic circuit or the like or may also include software or firmware for managing wireless communications. Software on the mobile device 102 or other device can synchronize or otherwise communicate with the wireless module in the display module 110 to provide data to the display module 110 or to receive data from the display module 110 for depiction on the mobile device 102.

Example types of data that may be useful to output to the display module 110 include notifications from applications running on the mobile device 102. Some examples of this data include messages such as text messages, e-mails, voicemails and the like, phone information such as information regarding whether a call has been received, regarding whether a voicemail has been received, a phone number obtained through caller ID or the like, or any portion thereof. In addition, applications other than messaging applications on the mobile device 102 may provide data that could be output to the display module 110. One example of such data is song titles that may be output related to a music player application running on the mobile device 102 and which are currently being played by the mobile device 102. Similarly, a playlist of songs could be displayed on the display module 110, from which a user may select a song for playback by the mobile device 102. Further, really simple syndication (RSS) feeds or other web feeds may be displayed on the display module 110. In some embodiments, when data is not being received from the mobile device 102 (or even when data is being displayed), a company logo or logos may be displayed on the display module 110. For example, a company may purchase cases 100 for its employees and request the manufacturer or provider of the cases 100 to include the company's logo on the display module 110 as, for example, a screen saver or the like.

In some embodiments, the display module 110 can show a text and/or image ticker that scrolls horizontally or vertically. However, the text need not scroll on the display module 110 but may instead appear in a single position on the display.

In addition, the display module 110 includes a button 120 adjacent to the display of the display module 110 that can enable interaction with the display module 110. The button 120 is omitted in FIG. 1B but may also be included in some embodiments in the configuration of FIG. 1B, for example, next to the display of the display module 110 on the inside of the cover 100. The button 120 may be used to perform any functions responsive to user pressing of the button 120. For example, the button 120 can be used to turn the display module 110 on or off or to select an option on the display module 110, for example, to scroll to the next e-mail or the next song or the like. Further, the button 120 can be used to pair with wireless modules in the mobile device 102 and the display module 110, as is common with Bluetooth devices, for instance. Other examples of functionality that may be provided by the button 120 are described in greater detail below. In another embodiment, the display module 110 is touch sensitive, omitting the use of a button 120 or being used in addition to the button 120.

It should be understood that, in various embodiments, the case 100 is not merely an integral cover portion of a flip-phone or clamshell phone. Rather, in certain embodiments, the case 100 is detachable from the mobile device 102 or at least more detachable than a cover portion of a flip-phone or clamshell phone, which typically could not be removed without a tool.

In some embodiments, the display module 110 may include audio, such as a speaker and/or a microphone. The speaker may output the same or similar content as may be output by the display of the display module 110, and the microphone may receive voice commands from a user that can be used to interact with a case sync application in the mobile device 102 (see FIG. 5).

Figure 2:
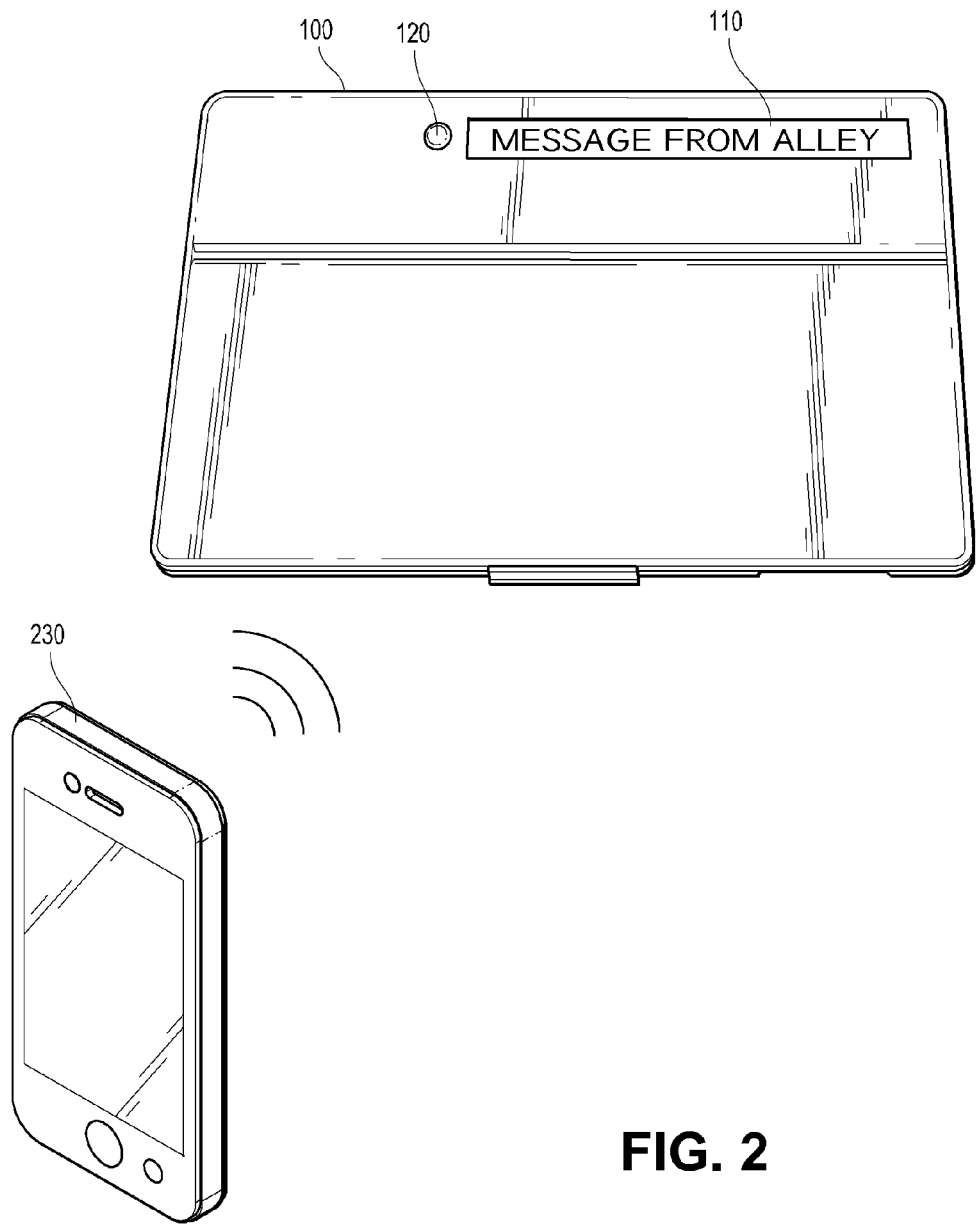
FIG. 2 depicts another embodiment of the cover shown in communication with a secondary mobile device.

Turning to FIG. 2, another embodiment of the cover 100 is shown covering a mobile device (not shown), such as the mobile device 102. The cover 100 again includes the display module 110 and the optional button 120. In the depicted embodiment, the display module 110 is communication with a secondary mobile device 230 that is physically separate from the cover 100. For example, the wireless module in the display module 110 can communicate wirelessly with the corresponding wireless module in the secondary mobile device 230.

The secondary mobile device 230 can be a second device other than the mobile device covered by the cover 100. In the depicted embodiment, the secondary mobile device 230 is a phone such as a smartphone or the like. However, any type of mobile device can be a secondary mobile device 230 that communicates with the display module 110. Further, the secondary mobile device 230 need not be a mobile device in some embodiments, but instead can be a desktop computer or the like.

One exemplary use, includes the use of the case for communicating between a secondary mobile device 230 and the display module 110 in circumstances which the user has both a cell phone and a tablet (or other mobile device) covered by the cover 100 or vice-versa. Such a user may be in a meeting and have the cover 100 covering the tablet so as not to disturb or appear to disturb the meeting. In addition, such a user may have his or her phone, e.g., the secondary mobile device 230, in his or her pocket on silent mode to avoid disturbing the meeting. However, it may be important or useful for the user to be notified when a call or other message comes through on the phone or secondary mobile device 230. The user may be unable to receive such a notification if the device is in the user's pocket or the display thereof is turned off, even if the device is sitting on the desk or table next to the user.

Thus, in certain embodiments, the device 230 can send notifications and other data to the display module 110, enabling the user to be notified of phone calls, messages or other information without turning on a display of the secondary mobile device 230 or even removing such a device 230 from the user's pocket.

Further, in other embodiments, both the mobile device 102 and the secondary mobile device 230 can communicate wirelessly with the display module 110 to provide notifications and other data.

Figure 3A:
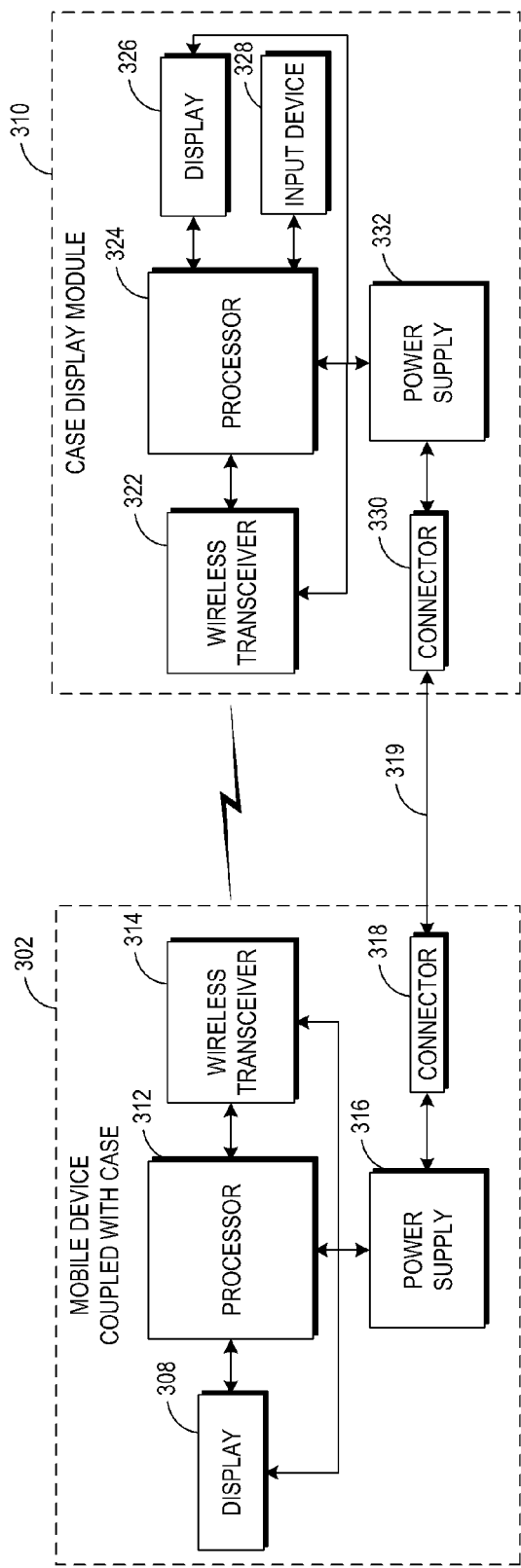
FIGS. 3A and 3B depict example block diagrams illustrating embodiments of mobile device and a case display module.

Turning to FIG. 3A, an example block diagram is shown that illustrates example components of a mobile device 302 and a case 100 having a case display module 310 that is capable of being in communication with the mobile device 302. The mobile device 302 is an example of the mobile device 102 described above, and the case 100 is an example of the case described above.

In the depicted embodiment, the mobile device 302 includes a display 308, a processor 312, a wireless transceiver 314, a power supply 316 and a connector 318. The components of the mobile device 302 have been simplified to show some example components. Other components may be included in some embodiments, while some of the components shown may be omitted in other embodiments.

The display 308 of the mobile device 302 may be a touch screen display or the like (or a non-touchscreen display). The processor 312 can be a physical computer processor (or processors) that include one or more cores or processor components, which can process data received to and from the display 310. For example, the processor 312 can include or implement applications that provide data and notifications to a user via the display 308. Such applications can be stored in a memory device (not shown). For instance, the processor 312 can implement a phone application, an e-mail application, a text message application, a music playing application, or a video game, among many other examples. Further, the processor 312 may include a synchronization or sync application (see, e.g., FIG. 5) that can control the behavior of synchronization of notifications and data with the case display module 310.

A wireless transceiver 314 in communication with the processor can communicate wirelessly with a corresponding wireless transceiver 322 in the case 100. Both the wireless transceivers 314 and 322 may include hardware, software, and/or firmware that implement Bluetooth, Wi-Fi, ZigBee, or any other wireless standard or protocol(s). The data processed by the processor 312 and the mobile device 302 may be provided to the wireless transceiver 314, which communicates this data, including notifications or other data, to the wireless transceiver 322 of the case display module 310.

The case display module 310 includes the wireless transceiver 322, a processor 324, a display 326, an input device 328, a connector 330, and a power supply 332. The wireless transceiver 322 can receive data from the wireless transceiver 314 of the mobile device 302 and pass this data to the processor 324. The processor 324 may have all the functionality of the processor 312 or a subset thereof. In one embodiment, the processor 324 may be a lower-cost processor than the processor 312 with fewer features. For instance, the processor 312 may be an 8-bit or 16-bit processor, although other types of processors 324 may be used in the case display module 310.

The processor 324 can output the received data on the display 326. The display 326 is an example of the display of the display module 110 described above. The display 326 can be an LCD display, an LED display, an OLED display, a touch display, a non-touch display, or the like and may be combined with an audio output from a speaker incorporated within or on the case or a speaker of a mobile device in communication with the case display module 310 of the case 100. The input device 328 is in communication with the processor 324 and may be the button 120 described above. Alternatively, the input device 328 may be more elaborate and include multiple buttons or other user input devices. The input device 328 can receive user input and provide this input to the processor 324. In turn, the processor 324 can process the user input and cause a corresponding output to be provided to the display 326. For instance, the received input may cause the processor 324 to cycle an output of a next received message on the display 326. In another embodiment, the input received causes the processor 324 to transmit the input or a processed version thereof to the mobile device 302 via the wireless transceiver 322. As an example, the input received may be a request to play a song, and the processor 324 can send a request for the song to the mobile device 302.

In some embodiments, the processor 324 of the case display module 310 may be omitted. Instead, data received from the wireless transceiver 322 can be provided directly from the wireless transceiver 322 to the display 326. Further, data provided from the input device 328 may be provided directly to the wireless transceiver 322 for transmission to the mobile device 302.

The power supply 332 in the case 300 can power the other components of the case 300, including the wireless transceiver 322, processor 324, display 326, and/or input device 328. The power supply 332 may include a battery or the like and/or optionally a solar panel that can be charged by the sun or other light source and may be located in proximity to the display 326 on the same panel of the case 100 or remote on a different panel of the case 100 or a stand-alone component. The power supply 332 may be connected to or placed in electrical communication with a connector 330, which can mate with the connector 318 in the mobile device 302 via a cable 319. The connector 318 is further in communication with the power supply 316 in the mobile device 302. In certain embodiments, the power supply 316 can charge the power supply 332 in the case 300 via the connectors 318, 330 and the cable 319. The cable 319 may be a universal serial bus (USB) cable or the like (see, e.g., FIG. 4) that can provide power between the mobile device 320 and the case 300. Further, in some embodiments, the connectors 318 and 330 are in communication with the processors 312 and 324 to provide data to and from the mobile device 302 and the case display module 310, as will be described in greater detail below.

Figure 3B:
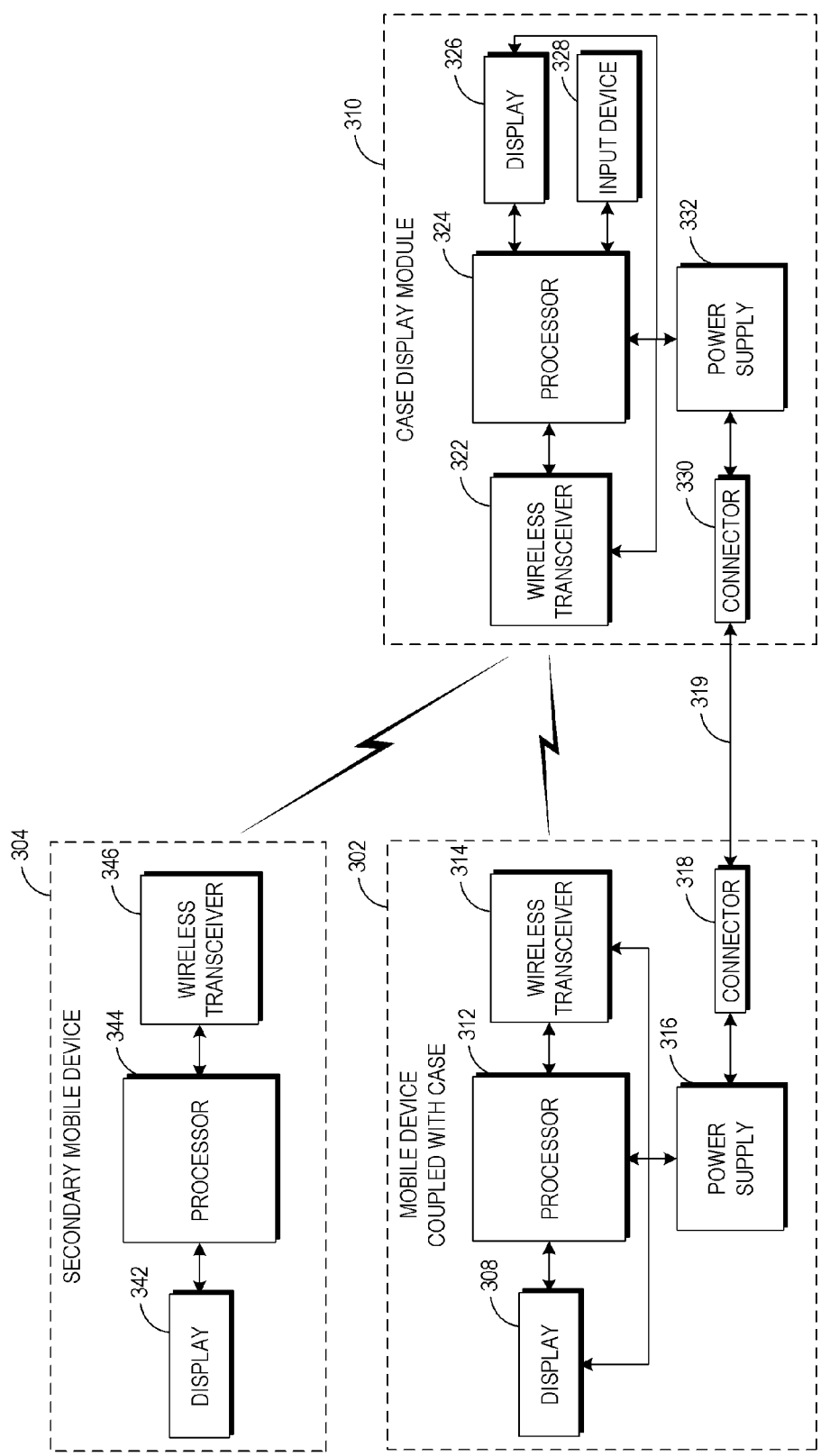

Turning to FIG. 3B, another block diagram is shown that shows an embodiment of the mobile device 302 and the case display module 310. The case display module 310 is also in communication with a secondary mobile device 304 that is an example of the secondary mobile device 230 described above. The secondary mobile device 304 includes a display 342, a processor 344, and a wireless transceiver 346. The processor 344 may implement any of the programs or applications described above with respect to the processor 312. For instance, the processor 344 may include a sync app that can control syncing behavior with the case display module 310 (see also FIG. 5). The wireless transceiver 346 can send notifications or other data from the applications from the processor 344 to the wireless transceiver 322 in the case for display on the display 326. Likewise, input from the input device 328 may be wirelessly transmitted from the wireless transceiver 322 to the wireless transceiver 346 of the secondary mobile device 304. This input may be used to retrieve information, change settings, select options, or otherwise interact with the secondary mobile device 304 in the same or similar manner as may be done with the mobile device 302.

Figure 4:
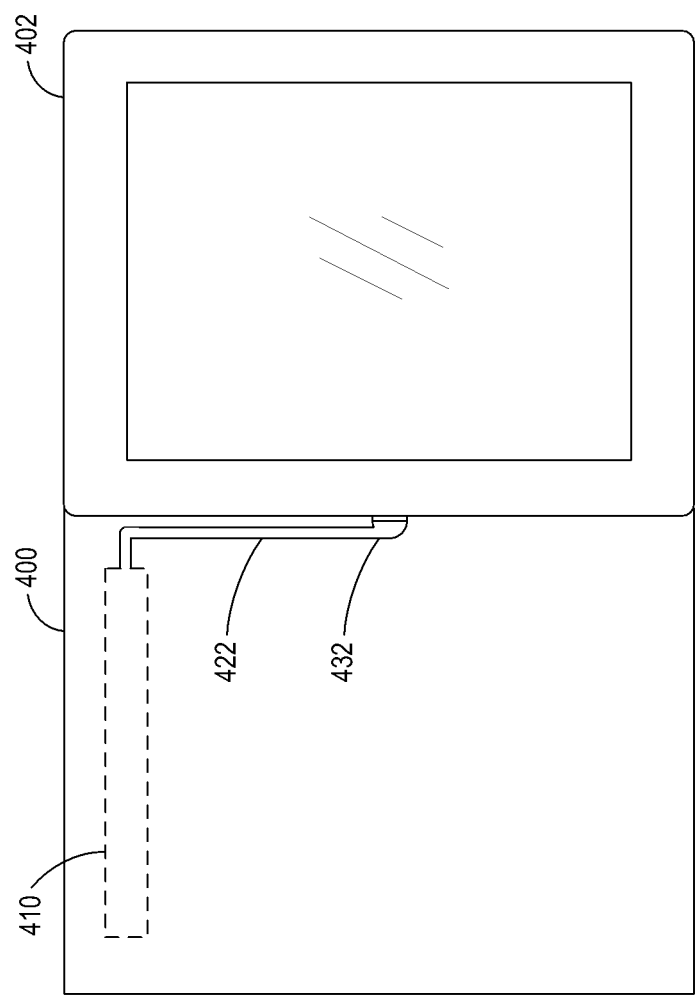
FIG. 4 illustrates an example power connector for connecting the case display module to the mobile device.

Turning to FIG. 4, another example embodiment of the case 400 is shown. The case 400 can include any of the features of the case 100 described above. The case 400 is shown in an open configuration, with a mobile device 402 coupled with the case 400. In this embodiment, the mobile device 402 is a tablet computer, although other types of mobile devices 402 may be coupled with the case 400. Further, an example display module 410 is shown in phantom. The example display module 410 can include any of the features of the display module 110 or 310 described herein. The display module 410 is shown in phantom because the display module 410 is on the outside of the case 400. However, the display module 410 could also be on the inside of the case 400 in other embodiments (see, e.g., FIG. 1B). Thus it is contemplated herein that one or more display modules could be located on the outside and/or inside of the case 100. In order to conserve battery life and/or power, the display 110, 326 may be controlled by the processor and/or an application to dim or be turned off when not in use or after a period of time after presenting notification or other information or data.

A power cable 422 extends from the display module 410 on the inside of the case 400 to the mobile device 402. The cable 422 connects to a USB cable connector 432, which may be a male USB connector that connects to a matching female connector in the mobile device 402. The connector 432 is an example of the connector 330 described above with respect to FIGS. 3A and 3B. The connector 432 may be a mini-USB connector, micro-USB connector, or full-size USB connector, among other types. Other forms of connectors may be used other than USB for the connector 432 including, for example, Lightning connectors, serial connectors, parallel connectors, or the like. In an embodiment, the cable 422 can be thin and flexible and may be tucked in the case 402 with minimal protrusion. The cable 422 may also be sewn into the case 400 in one embodiment so as to be partially or fully hidden from view.

The cable 422 can facilitate power transfer between the mobile device 402 (or other power source) and the display module 410. In addition, as described above, syncing may be performed between the display module 410 and a mobile device (e.g., 402) through the cable 422. Syncing may be performed without wireless functionality in an embodiment. Thus, wireless functionality may be omitted from the display module 410 and/or the mobile device 402. In some embodiments, some syncing or data transfers may be performed between the cable 422 and the mobile device 402 even if wireless functionality is still employed by the display module 410 to communicate with the mobile device 402. For example, the cable 422 may be used as a service access mechanism for software on the mobile device 402 to update software/firmware in the display module 410 or to otherwise perform maintenance on the display module 410.

III. Example Case Display Sync Application

Figure 5:
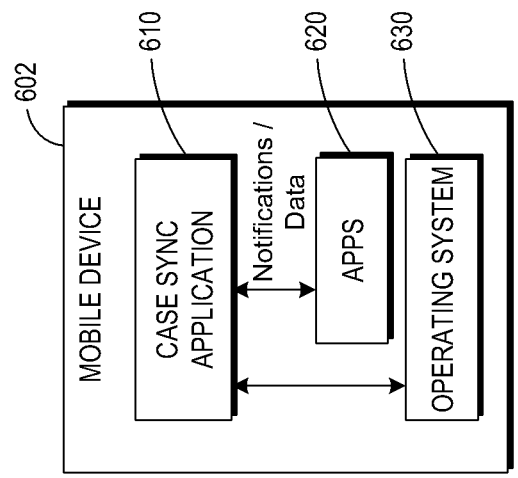
FIG. 5 illustrates example software components of a mobile device for communicating with the case display module.

Turning to FIG. 5, example software components of a mobile device 602 are shown. The mobile device 602 is an example of any of the mobile devices described above, including a mobile device that is coupled with a case or a secondary mobile device that communicates with the case. The mobile device 602 includes a case sync application 610, apps or applications 620 and an operating system 630, among possibly other software components. The software components shown may be implemented in physical computer hardware, such as the processor 312 or 344, a memory, and/or the like.

The case sync application 610 can communicate with the apps 620 and/or the operating system 630 to receive notifications and/or other data that may be provided by the case sync application 610 to the display described above. As described above, various apps 620 (such as messaging apps, games, weather apps, music player apps, or the like) can provide data and/or notifications to the case sync application 610. These notifications or data can include messages, texts, incoming phone calls, voicemails, e-mails, instant messages, chat requests, weather information and/or alerts, traffic alerts, twitter feeds, Facebook feeds, other social network feeds, game updates, web updates, news updates, RSS feed updates and/or the like.

Some notifications may also come from the operating system. Some examples of such notifications might include a low battery warning for the mobile device 602, lost or gained 3G or 4G signal or other wireless signal status indicator, Wi-Fi status indicator, a Bluetooth status indicator, a GPS status indicator, and other status indicators. These indicators may instead come from the apps 620 in some embodiments.

The case sync application 610 can output one or more user interfaces that enable a user to configure notifications that are sent to the display module of the case. The case sync application 610 can also provide functionality for a user to add a customized message or messages to be displayed on the display. For example, one such custom message can reflect a user's mood. A user might be able to type in, for instance, that he is in a good mood or a bad mood and have this information displayed onto the case display. Instead of requiring a user to type in such information, the case sync application 610 may instead provide buttons, drop down boxes, or other user interface controls that provide readily-available templates or sample messages that a user can select from to be output to the case display. For example, contact information of the user or owner of the case or mobile device such as name, telephone number, address, email address, web address or link etc., By way of another example, information regarding heath metrics such as calories burned, steps taken, heart rate, speed may also be communicated to the display module 310.

IV. Example Case Display Processes

Figure 6:
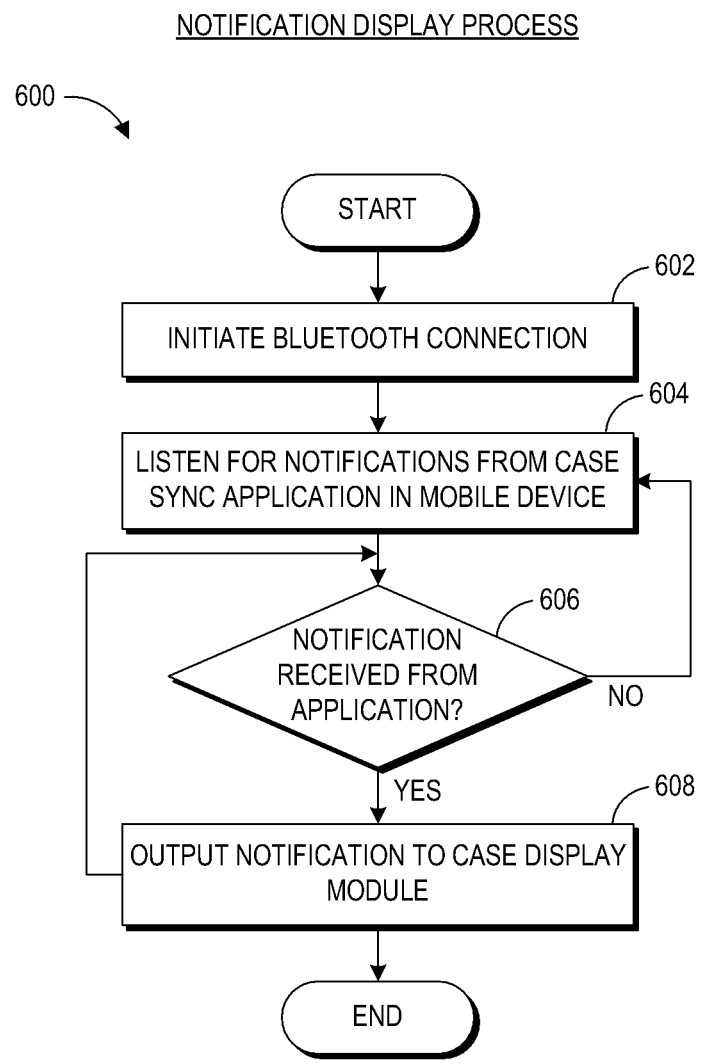
FIG. 6 depicts an embodiment of a notification display process for displaying notifications on a case display module.

Turning to FIG. 6, an embodiment of a notification display process 600 is shown. The notification display process 600 can be implemented by any of the case display modules described above. At block 602, a Bluetooth (or other wireless) connection is initiated between the case display module and the mobile device. At block 604, the case display module listens for notifications from the case sync application in the mobile device, such as the case application 610 described above. If a notification is received from the application, at block 606 the case display module can output the notification at block 608. Otherwise, the process 600 loops back to block 604, where the case display module continues to listen for notifications from the case sync application in the mobile device.

Figure 7:
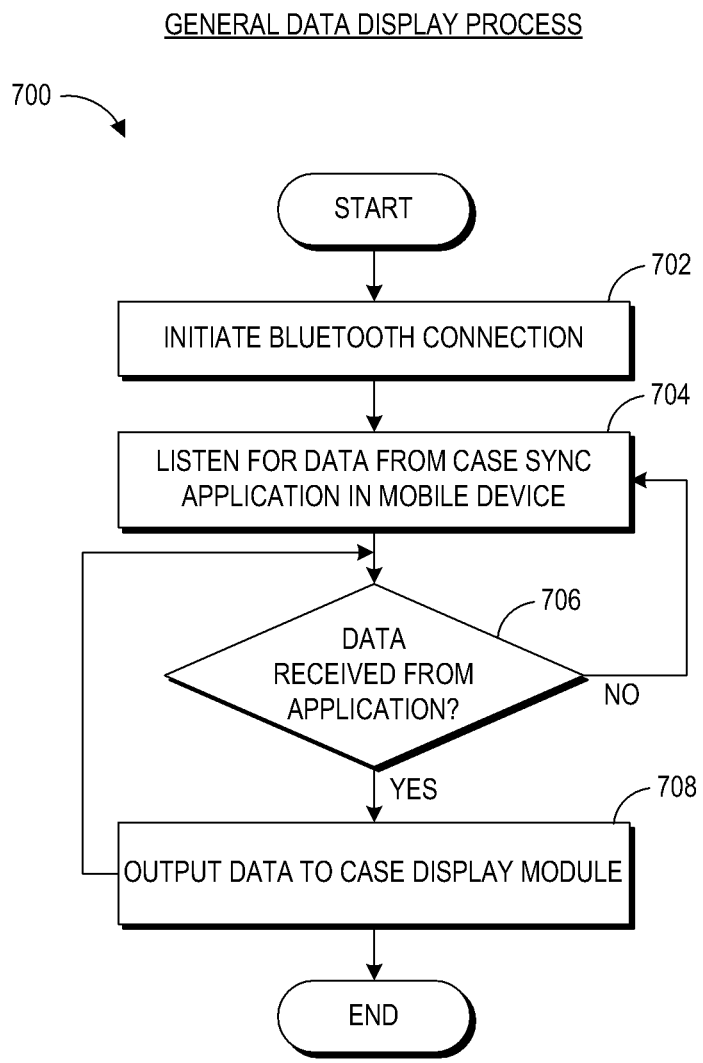
FIG. 7 depicts an embodiment of a general data display process for displaying data on a case display module.

Similar to the process 600 of FIG. 6, FIG. 7 illustrates a general data display process 700 that can be implemented by any of the case display modules described above. At block 702, the case display module again initiates a Bluetooth (or other wireless) connection and listens for data from the case sync application and the mobile device at block 704. This data can include information other than notifications, some examples of which are provided above with respect to FIG. 6 (among other examples). At block 706, if the data is received from the application, the data is output to the case display module at block 708. Otherwise, a process 700 continues to listen for data from the case sync application at block 704.

V. Example Mobile Application User Interfaces

Figure 8:
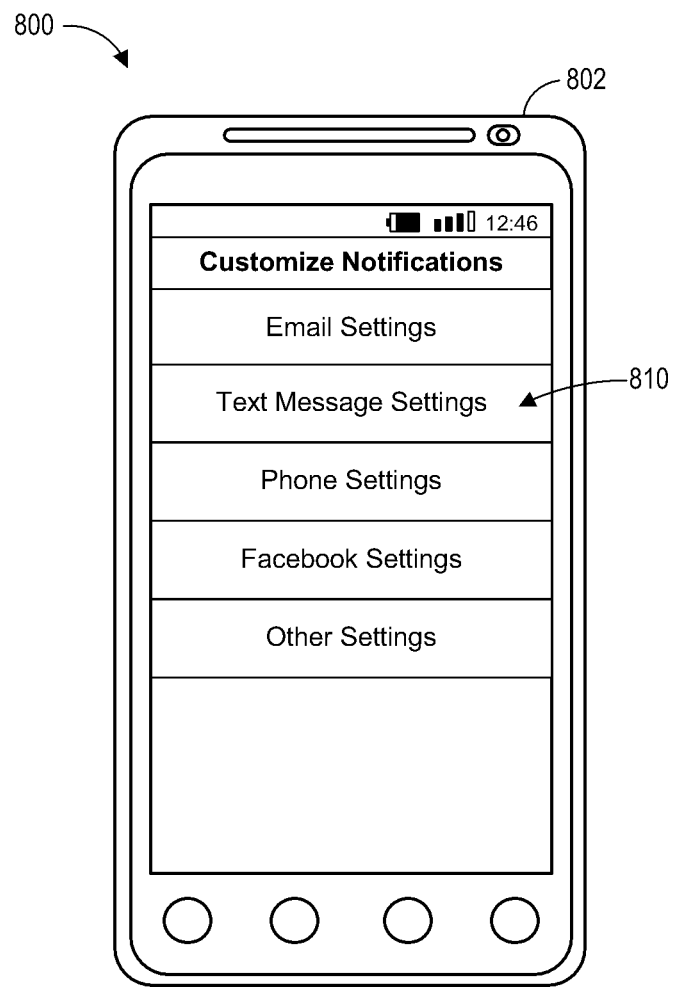
FIGS. 8 and 9 illustrate example user interfaces of a case display sync application.
Figure 9:
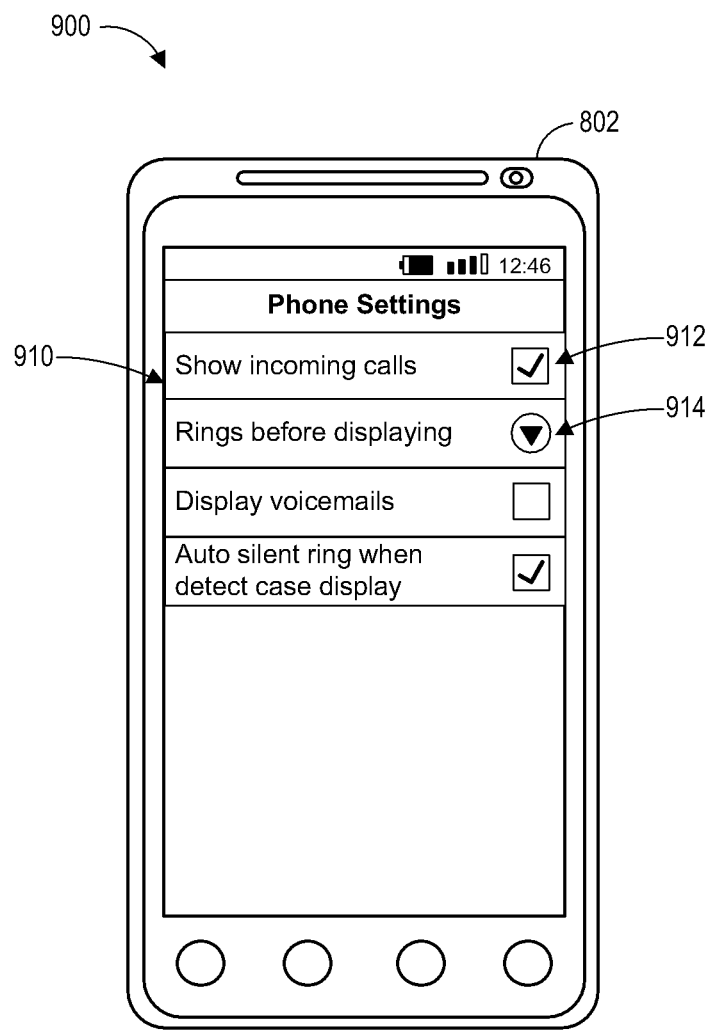

FIGS. 8 and 9 illustrate example user interfaces 800, 900 of the case display sync application described above (see, e.g., FIG. 5). These user interfaces 800, 900 are merely examples and may be varied in several embodiments. Each of the example user interfaces 800, 900 shown is depicted as being output by a mobile phone 802, which is an example of the mobile devices described above. The mobile phone 802 may have a touch screen or the like that allows a user to select user interface controls via touch or a stylus, or a combination of the same. However, it should be understood that the user interfaces 800, 900 need not be implemented in a mobile application on a mobile phone in some embodiments. Instead, in some embodiments, the user interfaces 800, 900 can be implemented in a web browser or in any device such as a tablet, laptop, or the like. Further, the user interfaces 800, 900 can be implemented in a web browser on a mobile phone as well.

In FIG. 8, the user interface 800 is an example of a custom notifications screen displayed on an example mobile device 802. The example mobile device 802 is a phone in the depicted embodiment. The user interface shown includes settings controls 810 that may be selected by a user to control or adjust the settings of notifications that may be sent to the case display. In the depicted embodiment, these settings controls 810 include touch interface buttons for accessing e-mail settings, text message settings, phone settings, Facebook settings, and other settings. Other application settings than those shown may be available from the user interface 800 in other embodiments.

User selection of one of the settings controls 810, for example, the phone settings control 810, can result in a display of a user interface similar to the user interface 900 of FIG. 9 being shown. In the user interface 900 of FIG. 9, example phone settings 910 are shown. User interface controls 912, 914 for adjusting such settings are also provided, including checkbox controls 912 and dropdown box controls 914. Other example user interface controls may be provided in other embodiments. Through these user interface controls 912, 914, a user can cause incoming calls to be shown by the case display module, adjust a number of rings to be made by the phone 802 before displaying on the case display module, whether or not to display voicemails, and whether or not to enter a silent ring mode automatically when the case display module is detected (e.g., via a Bluetooth connection). Many other example settings may be made in other embodiments.

VI. Additional Embodiments

In some additional embodiments, the case and included display module can communicate with the mobile device or secondary mobile device while the mobile device is not coupled with the case. As an example scenario, a laptop bag may be the case, and the display module may be attached to or coupled with the laptop bag. The mobile device may not be in the laptop bag, for instance, if the bag is being used as a suitcase and not as a laptop bag. However, a secondary mobile device (such as a phone) may be in communication with the display module on (or in) the laptop bag if the user has a secondary mobile device in his or her possession.

The display module can also be detachable from the case and may be placed on different cases.

VII. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of using a mobile device case, the method comprising:
    listening, with a display module of a mobile device case, for notifications from a case synchronization application in a mobile device, wherein said case is configured to be detachably coupled to and enclose the mobile device;
    receiving a notification from the case synchronization application while the mobile device and the display module are separate components; and
    outputting the notification to a display of the display module.

2. The method of claim 1, wherein said receiving comprises receiving the notification wirelessly.

3. The method of claim 1, wherein said receiving comprises receiving the notification through a cable connected between the display module and the mobile device.

4. The method of claim 1, wherein said display module comprises a user input device.

5. The method of claim 1, wherein the notification comprise one or more of the following: text notifications, phone call notifications, voicemail notifications, email notifications, and social network update notifications.

6. The method of claim 1, wherein the mobile device case is a hard case.

7. The method of claim 1, wherein the mobile device case is a soft case.

* * * * *